US012691817B2

(12) United States Patent
    Park et al.

(10) Patent No.: US 12,691,817 B2
(45) Date of Patent: Jul. 28, 2026

(54) CONSTRUCTION MACHINE

(71) Applicant: HD HYUNDAI INFRACORE CO., LTD., Incheon (KR)

(72) Inventors: Hyunjoo Park, Incheon (KR); Dongyoun Sohn, Seongnam-si (KR); Byoungheon Park, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 173 days.

(21) Appl. No.: 18/708,647

(22) PCT Filed: Nov. 8, 2022

(86) PCT No.: PCT/KR2022/017412
§ 371 (c)(1),
(2) Date: May 9, 2024

(87) PCT Pub. No.: WO2023/085718
PCT Pub. Date: May 19, 2023

(65) Prior Publication Data
US 2024/0416828 A1      Dec. 19, 2024

(30) Foreign Application Priority Data
Nov. 9, 2021    (KR) ........................ 10-2021-0153165

(51) Int. Cl.
*B60Q 1/44*        (2006.01)
*E02F 9/08*        (2006.01)
*E02F 9/18*        (2006.01)
(52) U.S. Cl.
CPC .............. *B60Q 1/44* (2013.01); *E02F 9/0866* (2013.01); *E02F 9/0891* (2013.01); *E02F 9/18* (2013.01)

(58) Field of Classification Search
None
See application file for complete search history.

(56)        References Cited

U.S. PATENT DOCUMENTS

| | | | | |
|---|---|---|---|---|
| 10,737,610 B1* | 8/2020 | Stinar, Sr. | ................ | B60Q 1/44 |
| 2009/0172983 A1* | 7/2009 | Curtis | ..................... | G09F 21/04 |
| | | | | 40/591 |
| 2010/0038100 A1* | 2/2010 | Schuetzle | .............. | A62C 27/00 |
| | | | | 137/565.01 |

FOREIGN PATENT DOCUMENTS

| | | |
|---|---|---|
| JP | H7-102596 A | 4/1995 |
| JP | H10-183687 A | 7/1998 |

(Continued)

OTHER PUBLICATIONS

International Search Report issued Feb. 24, 2023, corresponding to International Application No. PCT/KR2022/017412 with its English translation, 5 pages.

(Continued)

*Primary Examiner* — Thomas S Mccormack
(74) *Attorney, Agent, or Firm* — Hauptman Ham, LLP

(57)        ABSTRACT

A construction machine according to an embodiment of the present invention comprises: a rear member, which is provided at the rear of an engine room and has a through-hole allowing communication with the engine room; a support plate attached to the other surface of the rear member, which is opposite to one surface facing the engine room; a multi-functional auxiliary brake light, which is coupled to the support plate, and extends in the horizontal direction so as to express one selected from a plurality of on/off patterns; a cable connected to the multifunctional auxiliary brake light through the through-hole of the rear member; and a control device connected to the cable so as to control the multifunctional auxiliary brake light.

17 Claims, 10 Drawing Sheets

(56)          References Cited

FOREIGN PATENT DOCUMENTS

| JP | 2000-240104 A | 9/2000 |
| JP | 2002-227252 A | 8/2002 |
| JP | 2002-327469 A | 11/2002 |
| KR | 10-2006-0063666 A | 6/2006 |
| KR | 10-2011-0072071 A | 6/2011 |

OTHER PUBLICATIONS

Written Opinion issued Feb. 24, 2023, corresponding to International Application No. PCT/KR2022/017412, 4 pages.
The extended European search report dated Oct. 13, 2025 for corresponding European Patent Application No. 22893138.2 (9 pages).

* cited by examiner

Figure 7:
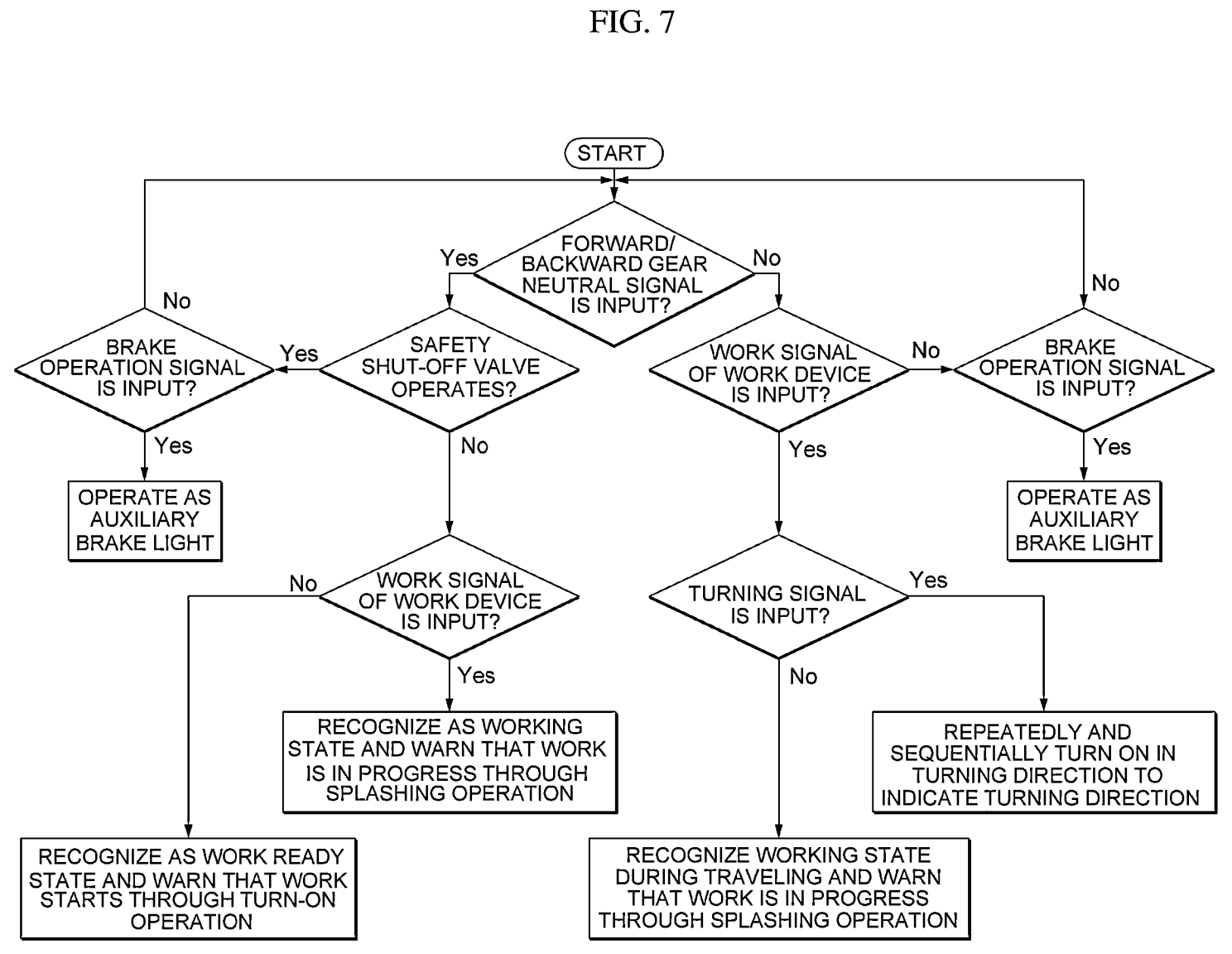

START

FORWARD/BACKWARD GEAR NEUTRAL SIGNAL IS INPUT?

No →

WORK SIGNAL OF WORK DEVICE IS INPUT?

No →

BRAKE OPERATION SIGNAL IS INPUT?

Yes → OPERATE AS AUXILIARY BRAKE LIGHT

WORK SIGNAL OF WORK DEVICE IS INPUT?

Yes →

TURNING SIGNAL IS INPUT?

Yes → REPEATEDLY AND SEQUENTIALLY TURN ON IN TURNING DIRECTION TO INDICATE TURNING DIRECTION

No → RECOGNIZE WORKING STATE DURING TRAVELING AND WARN THAT WORK IS IN PROGRESS THROUGH SPLASHING OPERATION

Yes →

SAFETY SHUT-OFF VALVE OPERATES?

No →

WORK SIGNAL OF WORK DEVICE IS INPUT?

Yes → RECOGNIZE AS WORKING STATE AND WARN THAT WORK IS IN PROGRESS THROUGH SPLASHING OPERATION

No → RECOGNIZE AS WORK READY STATE AND WARN THAT WORK STARTS THROUGH TURN-ON OPERATION

Yes →

BRAKE OPERATION SIGNAL IS INPUT?

Yes → OPERATE AS AUXILIARY BRAKE LIGHT

No →

CONSTRUCTION MACHINE

CROSS REFERENCE TO RELATED APPLICATION

The present application is a national stage filing under 35 U.S.C § 371 of PCT application number PCT/KR2022/017412 filed on Nov. 8, 2022, which is based upon and claims the benefit of priority to Korean Patent Application Nos. 10-2021-0153165, filed on Nov. 9, 2021, in the Korean Intellectual Property Office. All of the aforementioned applications are incorporated herein by reference in their entireties.

TECHNICAL FIELD

The present disclosure relates to a construction machine, and more particularly, to a construction machine including an auxiliary brake light.

BACKGROUND ART

Construction machines broadly refer to all machines used in civil engineering or building construction. In general, construction machines have an engine and a hydraulic pump that operates with power of the engine and travels with hydraulic oil discharged by the hydraulic pump or drives various work devices. In addition, construction machines are equipped with various attachments depending on the type of work to be performed. For example, an excavator, a type of construction machine, is selectively equipped with various attachments, such as an excavating bucket, a breaker, a vibrator, and a hammer at one end of an arm thereof.

In this manner, construction machines not only drive for movement, but also perform work at various work sites.

However, conventionally, when a construction machine is working at a work site, a current work state is indicated through beacons. Also, beacons are configured so that workers may select ON/OFF through switches. Therefore, in a workplace, the construction machine that works with the beacon on and a construction machine that works with the beacon off coexist, making it difficult for other workers working around the construction machines to recognize a working state of a current construction machine at a glance. In addition, there is a problem in that it is difficult to clearly distinguish between the type of work the construction machine is working on, a state in which the construction machine is ready for work, or a state in which the construction machine is working.

In addition, when a construction machine moves on the road, a worker may operate work devices to align equipment or lower or raise a boom. In this case, there is a risk of an accident because there is no way for vehicles behind or around the construction machine to recognize an operation state of the construction machine.

DETAILED DESCRIPTION OF INVENTION

Technical Problems

According to an embodiment of the present disclosure, the present disclosure provides a construction machine capable of giving a warning to surroundings by classifying various work states through a multifunctional auxiliary brake light.

Technical Solution

According to an embodiment of the present disclosure, a construction machine includes: a rear member provided at the rear of an engine room and having a through-hole communicating with the engine room; a support plate attached to the other surface of the rear member opposite to one surface facing the engine room; a multifunctional auxiliary brake light coupled to the support plate and extending in a left-right direction to express a selected one of a plurality of lighting or flashing patterns: a cable connected to the multifunctional auxiliary brake light through the through-hole of the rear member; and a control device connected to the cable to control the multifunctional auxiliary brake light.

The support plate may be formed in a structure that seals the engine room.

The rear member may be a counterweight.

The counterweight may include a curved shape, and the multifunctional auxiliary brake light may have a shape corresponding to the curved shape of the counterweight and is coupled to the counterweight.

The construction machine may further include: a protective plate coupled to the support plate and surrounding an edge of the multifunctional auxiliary brake light to protect the multifunctional auxiliary brake light.

The protective plate may be buried in the counterweight to be coupled to the counterweight.

The rear member may be an engine room cover.

The support plate may be formed to surround the entire multifunctional auxiliary brake light.

The multifunctional auxiliary brake light may include: a lamp portion; and a coupling portion fastened to the support plate by a bolt to couple the lamp portion to the support plate.

The coupling portion may include a bolt fastening hole and a plurality of reinforcing ribs formed radially around the bolt fastening hole.

The construction machine may further include: a traveling body; and a rotating body rotatably installed above the traveling body and including the engine room, the rear member, and various work devices.

The construction machine may further include: an operating device configured to perform various operations of the traveling body and the rotating body: a swing sensor configured to detect a turning operation of the rotating body; and a safety shut-off valve configured to cut off pilot pressure to control the operation of the work device, wherein the control device selects one of the plurality of lighting or flashing patterns to be expressed by the multifunctional auxiliary brake light according to an information signal provided by one or more of the operating device, the swing sensor, and the safety shut-off valve and operation information of the work device.

When a forward/reverse gear neutral signal is input, the safety shut-off valve operates, and a brake operation signal is input, the control device may turn on the multifunctional auxiliary brake light as an auxiliary brake light.

When a forward/reverse gear neutral signal is input, the safety shut-off valve does not operate, and a work signal of the work device is not input, the control device may recognize as a work ready state and turn on the multifunctional auxiliary brake light to warn that work starts.

When a forward/reverse gear neutral signal is input, the safety shut-off valve does not operate, and a work signal from the work device is input, the control device may recognize as a working state and cause the multifunctional auxiliary brake light to be flashed to warn that work is in progress.

When a forward/reverse gear neutral signal is not input and a work signal from the work device is not input, the control device may turn on the multifunctional auxiliary brake light as an auxiliary brake light.

When a forward/reverse gear neutral signal is not input, a work signal from the work device is input, and a turning signal is not input, the control device may recognize as a working state and flash the multifunctional auxiliary brake light to worn that work is in progress.

When the forward/backward gear neutral signal is not input, a work signal from the work device is input, and a turning signal is input, the control device may repeatedly and sequentially turn on the multifunctional auxiliary brake light in a turning direction to indicate the turning direction.

Effect of Invention

According to an embodiment of the present disclosure, the construction machine may give a warning to surroundings by classifying various work states through a multifunctional auxiliary brake light.

BRIEF DESCRIPTION OF THE DRAWING

FIG. 7 is a flowchart showing a control method for a multifunctional auxiliary brake light used in a construction machine according to the first embodiment of the present disclosure.

BEST MODE FOR CARRYING OUT THE INVENTION

Figure 1:
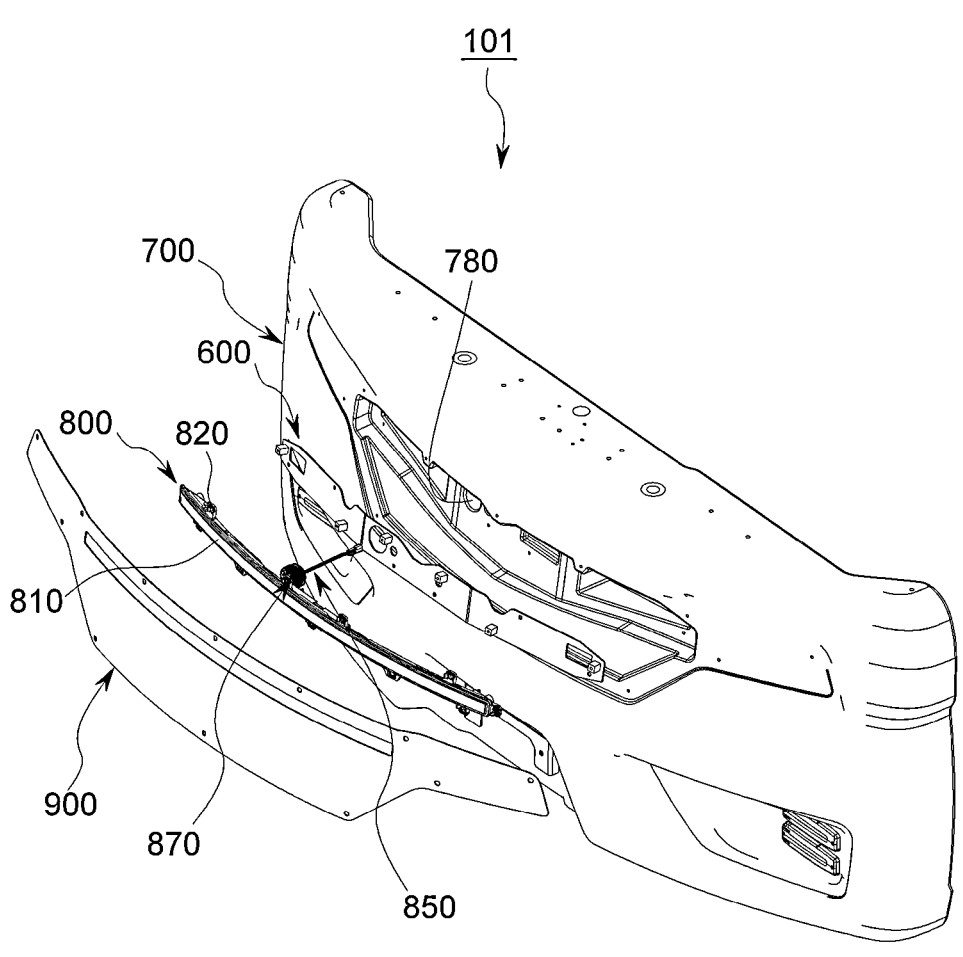
FIG. 1 is an exploded perspective view showing a portion of a construction machine according to a first embodiment of the present disclosure.
Figure 2:
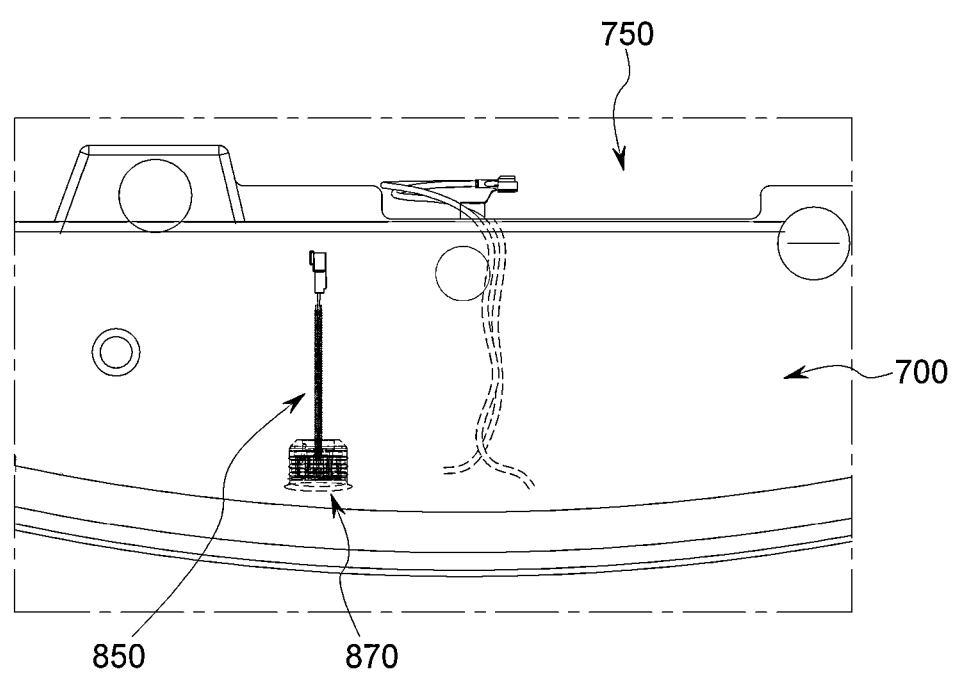
FIG. 2 shows an image of a portion of the construction machine of FIG. 1 projected from above.
Figure 3:
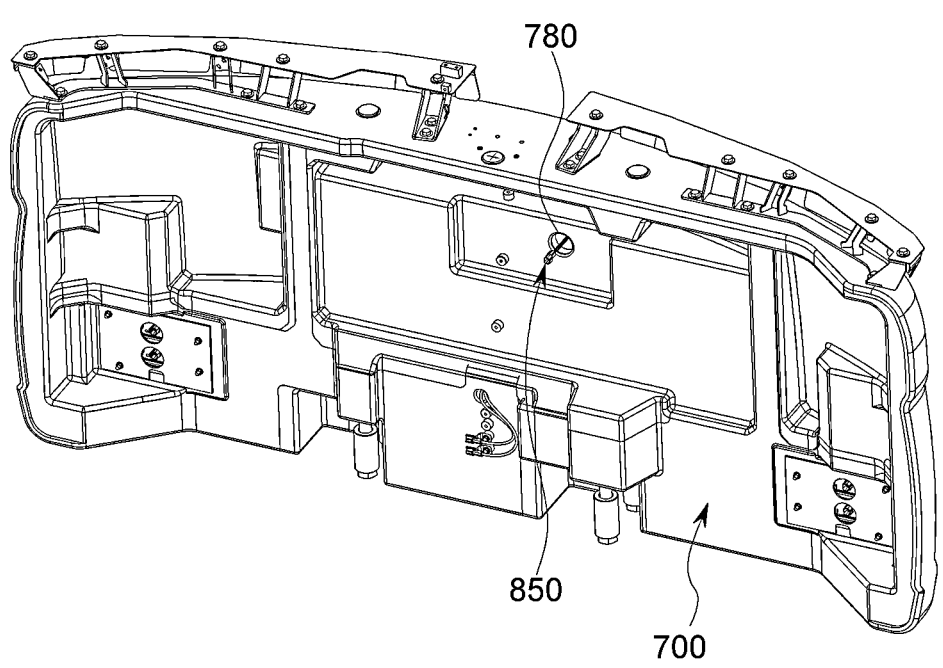
FIG. 3 is an image showing the rear of a counterweight of the construction machine of FIG. 1.

Hereinafter, embodiments of the present disclosure will be described in detail with reference to the accompanying drawings so that those skilled in the technical field to which the present disclosure pertains may carry out the embodiments. The present disclosure may be implemented in various different forms, and is not limited to the embodiments described herein.

Further, in various embodiments, since like reference numerals designate like elements having the same configuration, a first embodiment is representatively described, and in other embodiments only configurations that differ from the first embodiment will be described.

The drawings are schematically illustrated, and the scales of the drawings are not necessarily identical to each other. Relative dimensions and ratios of the parts illustrated in the drawings may be exaggerated or reduced in terms of sizes thereof for clarification of the drawings and convenience, and any dimension is only illustrative, and is not necessarily limited thereto. The same structures, elements or components illustrated in two or more drawings are designated by the same reference numerals so as to illustrate the same or similar features.

Embodiments of the present disclosure are presented as idealized embodiments of the present disclosure. As a result, various modifications of the drawings are expected. The disclosed embodiments are not limited to the specific forms in certain regions illustrated in the drawings, and for example, include modifications of such forms by manufacturing.

All technical or scientific terms used herein have meanings that are generally understood by a person having ordinary knowledge in the art to which the present disclosure pertains, unless otherwise specified. The terms used herein are selected only for a clearer illustration of the present disclosure, and are not intended to limit the scope of claims in accordance with the present disclosure.

The expressions "include", "provided with", "have" and the like used herein should be understood as open-ended terms connoting the possibility of inclusion of other embodiments, unless otherwise mentioned in a phrase or sentence including the expressions.

A singular expression used herein may include meanings of plurality, unless otherwise mentioned, and the same is applied to a singular expression stated in the claims.

Hereinafter, a construction machine 101 according to a first embodiment of the present disclosure is described with reference to FIGS. 1 to 6.

For example, the construction machine 101 may be an excavator. In addition, the construction machine 101 may include a traveling body for traveling and a rotating body rotatably installed in an upper portion of the traveling body.

The traveling body may support the rotating body and causes the construction machine 101 to travel through the traveling device using power generated by an engine. For example, the traveling body may be a wheel-type traveling body including a plurality of driving wheels.

The rotating body may rotate on the traveling body to set a working direction. The rotating body may include a frame, a driving room installed in the frame, and various work devices 300 (shown in FIG. 6). In addition, the rotating body may include an engine room 750 (shown in FIG. 2).

Specifically, the work device 300 may include a boom, an arm, and a bucket. Also, the work device may include a boom cylinder for controlling movement of the boom, an arm cylinder for controlling movement of the arm, and a bucket cylinder for controlling movement of the bucket. In addition, in the construction machine 101, a plurality of attachments including a tilt rotator, a shovel, a breaker, a vibrator, and a hammer, instead of a bucket, may be selectively mounted depending on the type of work.

In addition, the construction machine 101 according to the first embodiment of the present disclosure may include a rear member 700, a support plate 600, a multifunctional auxiliary brake light 800, a cable 850, and a control device 500.

In addition, the construction machine 101 according to the first embodiment of the present disclosure may further include an insulating stopper 870 and a protective plate 900.

In addition, the construction machine 101 according to the first embodiment of the present disclosure may further include an operating device 400, a swing sensor 450, a safety shut-off valve 470, and a control device 500.

The rear member 700 is installed at the rear of the engine room 750 provided in the rotating body. Also, in the first embodiment of the present disclosure, the rear member 700 may be a counterweight. These counterweight may be installed to increase a workable critical load of the construction machine 101.

Meanwhile, the counterweight may have a curved shape, and the multifunctional auxiliary brake light 800 to be described below may have a shape corresponding to the curved shape of the counterweight and may be coupled to the counterweight.

In the first embodiment of the present disclosure, the rear member 700 may be formed with a through-hole 780 communicating with the engine room 750. Specifically, the through-hole 780 penetrates through one side of the rear member 700 facing the engine room 750 and the other side opposite the one side.

The support plate 600 may be attached to one side of the rear member 700 opposite to the other side of the engine room 750. The support plate 600 detachably couples the multifunctional auxiliary brake light 800 to be described below to the rear member 700. To this end, the support plate 600 may include a plurality of fastening holes. In addition, a hole corresponding to the through-hole 780 of the rear member 700 may be formed in the support plate 600.

In addition, the support plate 600 may be formed in a structure that seals the engine room 750. To this end, the support plate 600 may be used together with the insulating stopper 870. The insulating stopper 870 may block the through-hole 780 while the cable 850 penetrates through the through-hole 780. The insulating stopper 870 may prevent heat from the engine room 750 from being transmitted to the multifunctional auxiliary brake light 800 through the through-hole 780 of the rear member 700 and causing thermal damage to the multifunctional auxiliary brake light 800. For example, the insulating stopper 870 may be formed of rubber.

The multifunctional auxiliary brake light 800 may be coupled to the support plate 600 and may extend in a left-right direction to express a selected one of a plurality of lighting or flashing patterns. For example, the multifunctional auxiliary brake light 800 may be turned on or flash or turn on repeatedly and sequentially in one direction. Here, the left-right direction refers to a horizontal direction when the construction machine 101 is viewed from the rear.

Specifically, the multifunctional auxiliary brake light 800 may include a lamp portion 810 and a coupling portion 820 fastened to the support plate 600 by a bolt 680 to couple the lamp portion 810 to the support plate 600.

Figure 4:
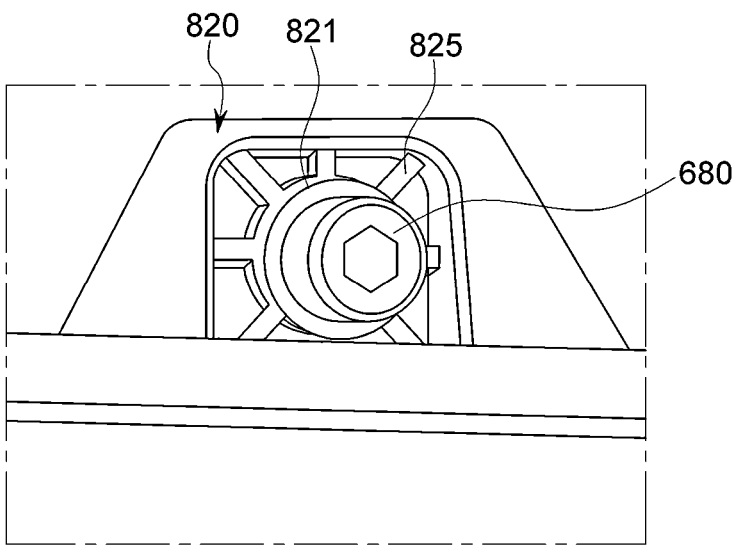
FIGS. 4 and 5 are images showing a coupling portion of a multifunctional auxiliary brake light of FIG. 1.
Figure 5:
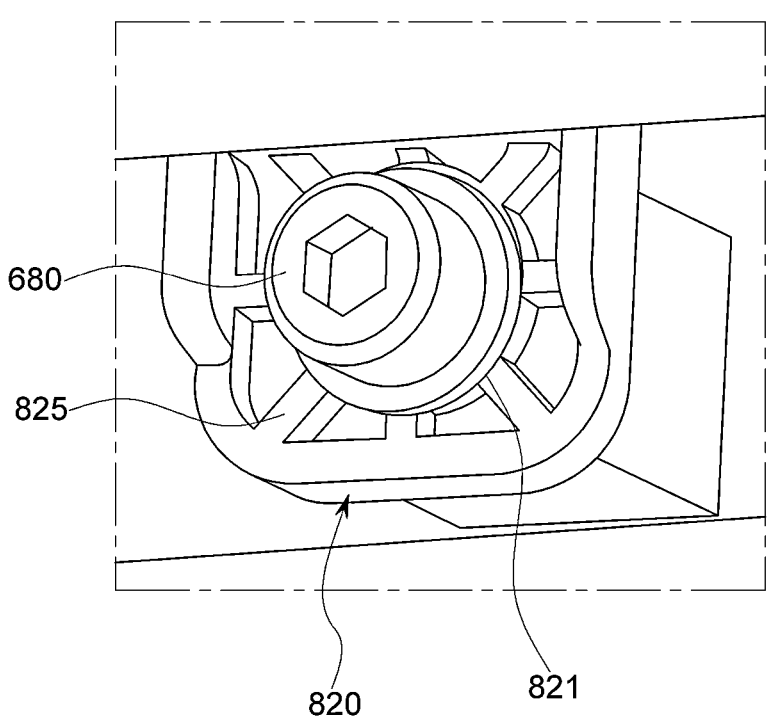

As shown in FIGS. 4 and 5, the coupling portion 820 may include a bolt fastening hole 821 through which the bolt 680 is fastened and a plurality of reinforcing ribs 825 formed radially around the bolt fastening hole 821. In addition, The coupling portion 820 may be provided in plurality along the circumference of the lamp portion 80.

The coupling portion 820 prepared in this manner improves the vibration resistance characteristics and strength to protect the lamp portion 810 from vibrations since vibrations are severe in terms of the construction machine 101 and is designed to distribute stress by increasing a contact area with the support plate 600.

The cable 850 may be connected to the multifunctional auxiliary brake light 800 through the through-hole 780 of the rear member 700. The cable 850 may supply a control signal and electricity to the multifunctional auxiliary brake light 800.

Figure 6:
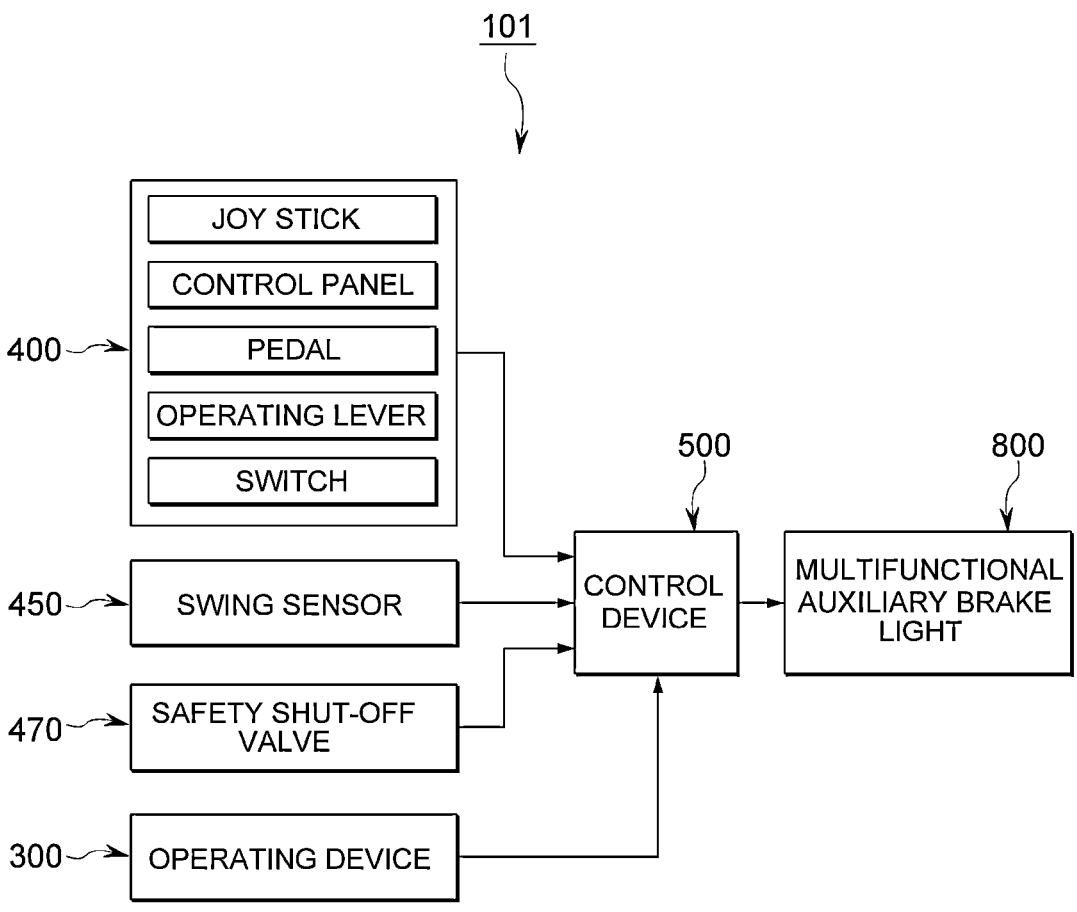
FIG. 6 is a configuration diagram showing a control system for a multifunctional auxiliary brake light used in a construction machine according to the first embodiment of the present disclosure.

The control device 500 may be connected to the cable 850 and may control the multifunctional auxiliary brake light 800. At this time, as shown in FIG. 6, the control device 500 may selectively control one of the plurality of lighting or flashing patterns to be expressed by the multifunctional auxiliary brake light 800 depending on an information signal provided by one or more of the operating device 400, the swing sensor 450, and the safety shut-off valve 470 and work information of the work device 300.

For example, the control device 500 may be installed in the engine room 750 or on one side of the rear member 700 facing the engine room 750. However, the installation location of the control device 500 is not limited to the above.

The protective plate 900 may be coupled to the support plate 600 and surround the edge of the multifunctional auxiliary brake light 800 to protect the multifunctional auxiliary brake light 800. For example, the protective plate 900 may be buried in the counterweight, which is the rear member 700, to be coupled to the counterweight.

The operating device 400 may be installed in a driving compartment of the rotating body to perform various operations of the traveling body and the rotating body. The operating device 400 may include a joystick, a control panel, a pedal, as well as various operating levers and switches.

The swing sensor 450 may detect a rotating operation of the rotating body.

The safety shut-off valve 470 may block pilot pressure for controlling the operation of the work device 500 according to a user's operation.

Accordingly, the control device 500 selects one of the plurality of lighting or flashing patterns to be expressed by the multifunctional auxiliary brake light 800 according to the information signal provided by one or more of the operating device 400, the swing sensor 450, and the safety shut-off valve 450 described above and the work information of the work device 300. At this time, depending on a case, the control device 500 may receive an additional information signal from one or more of a key box, a gear box, and a brake device and use the same to control the multifunctional auxiliary brake light 800.

Hereinafter, a method of controlling the multifunctional auxiliary brake light 800 in the construction machine 101 according to the first embodiment of the present disclosure is described with reference to FIG. 7.

First, when a forward/reverse gear neutral signal is input, the safety shut-off valve 470 may operate, and a brake operation signal is input, the control device 500 may turn on the multifunctional auxiliary brake light 800 as an auxiliary brake light. That is, when the brake device operates, the multifunctional auxiliary brake light 800 may be turned on.

Next, when the forward/reverse gear neutral signal is input, the safety shut-off valve 470 does not operate, and a work signal of the work device 300 is not input, the control device 500 may recognize it as a work ready state and turn on the multifunctional auxiliary brake light 800 to warn that work starts. That is, the control device 500 may turn on the multifunctional auxiliary brake light 800 to alert workers who work around the construction machine 101 to warn that the construction machine 101 will soon start to work.

Next, when the forward/reverse gear neutral signal is input, the safety shut-off valve 470 does not operate, and the work signal from the work device 300 is input, the control device 500 recognizes it as a working state and causes the multifunctional auxiliary brake light 800 to be flashed to warn that work is in progress. That is, the multifunctional auxiliary brake light 800 may be flashed to warn workers who work around the construction machine 101 that the construction machine 101 is currently working.

Next, when the forward/reverse gear neutral signal is not input and the work signal from the work device 300 is not input, the control device 500 may turn on the multifunctional auxiliary brake light 800 as an auxiliary brake light. That is, when the brake device operates, the multifunctional auxiliary brake light 800 may be turned on.

Next, when the forward/reverse gear neutral signal is not input, the work signal from the work device 300 is input, and a turning signal is not input, the control device 500 may recognize it as a working state and may flash the multifunctional auxiliary brake light 800 to worn that work is in progress. That is, the control device 500 may flash the multifunctional auxiliary brake light 800 to warn workers who work around the construction machine 101 that the construction machine 101 is currently working. In this case, the control device 500 may recognize a work state during traveling and warn that work is in progress.

Next, when the forward/backward gear neutral signal is not input, the work signal from the work device 300 is input, and the turning signal is input, the control device 500 may repeatedly and sequentially turn on the multifunctional auxiliary brake light 800 in a turning direction to indicate the turning direction. For example, when the rotating body of the construction machine 101 turns left, the multifunctional auxiliary brake light 800 may be turned on sequentially from left to right in a longitudinal direction. Conversely, when the rotating body of the construction machine 101 turns right, the multifunctional auxiliary brake light 800 may be turned on sequentially from right to left in the longitudinal direction.

With this configuration, the construction machine 101 according to the first embodiment of the present disclosure may effectively give a warning to surroundings by classifying various work states through the multifunctional auxiliary brake light 800.

Hereinafter, a second embodiment of the present disclosure will be described with reference to FIGS. 8 to 10.

Figure 8:
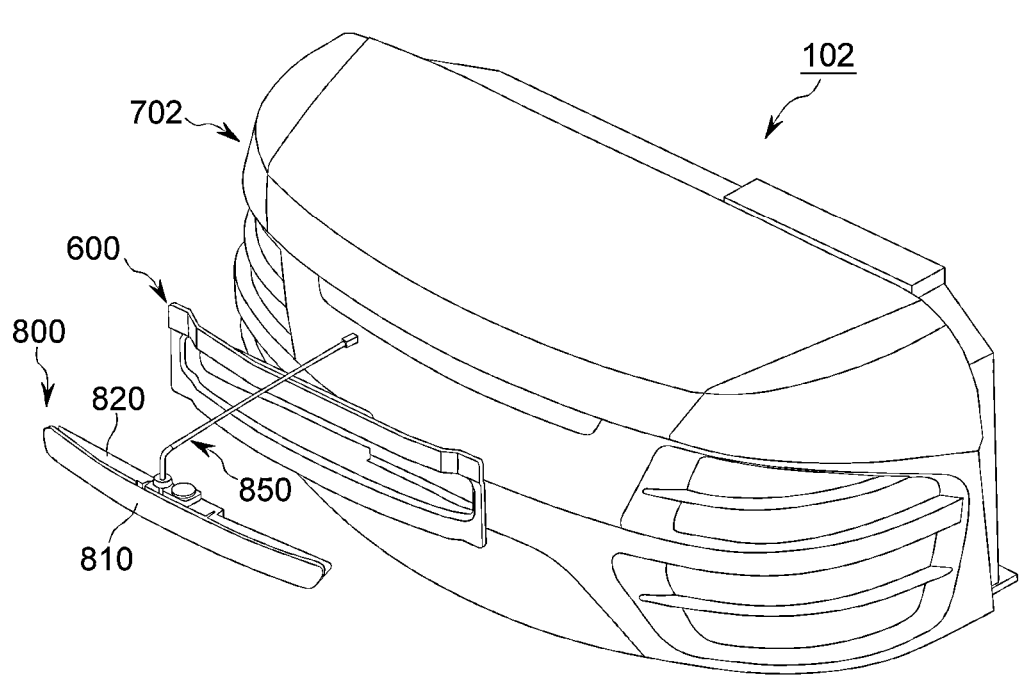
FIG. 8 is an exploded perspective view showing a portion of a construction machine according to a second embodiment of the present disclosure.
Figure 9:
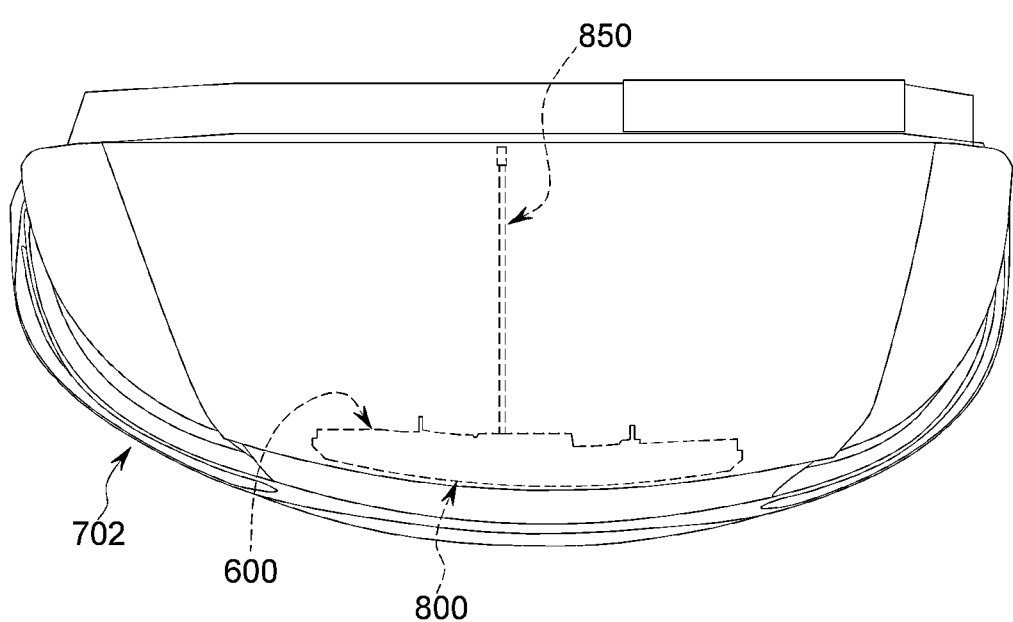
FIG. 9 shows an image of a portion of the construction machine of FIG. 8 projected from above.

As shown in FIGS. 8 and 9, in the second embodiment of the present disclosure, the rear member 700 may be an engine room cover.

In addition, the support plate 600 may be formed to surround the entire multifunctional auxiliary brake light 800. Also, the protective plate 900 used in the first embodiment may be omitted.

Figure 10:
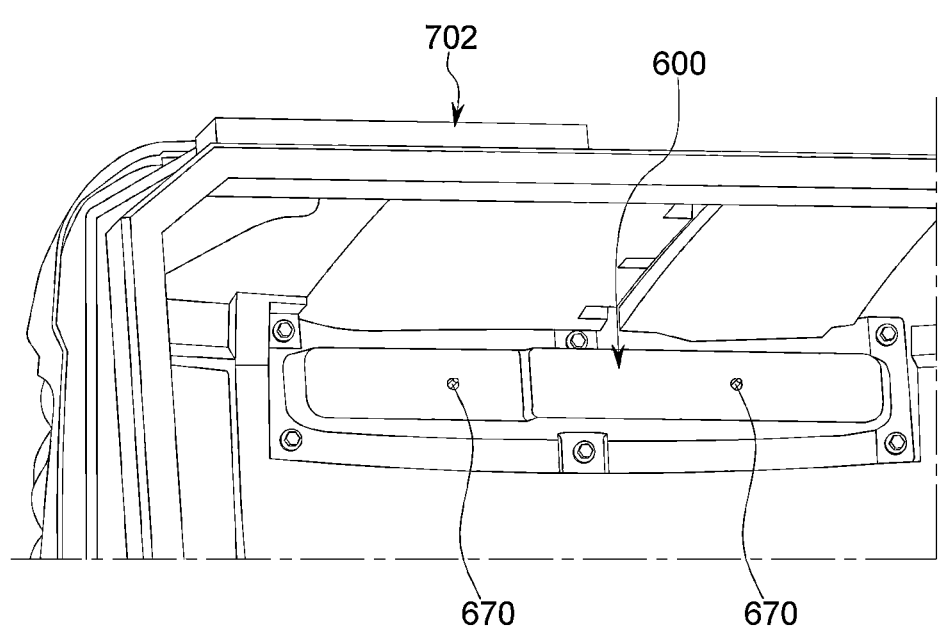
FIG. 10 is an image showing a portion of the rear of an engine room cover of the construction machine of FIG. 8.

In addition, as shown in FIG. 10, when the support plate 600 is coupled to the engine cover, which is the rear member 700, the support plate 600 may be guided to be coupled to the rear member 700 in a correct position by using a guide pin 670 to ensure positional alignment of the multifunctional auxiliary brake light 800 surrounded by the support plate 600.

Meanwhile, the method of controlling the multifunctional auxiliary brake light 800 is the same as the first embodiment described above.

Through this configuration, a construction machine 102 according to the second embodiment of the present disclosure may also effectively give a warning to surroundings by classifying various work states through the multifunctional auxiliary brake light 800.

Although the embodiments of the present disclosure have been described above with reference to the drawings, it will be understood by those skilled in the art that the present disclosure may be embodied in other specific forms without changing the technical spirit or essential features of the present disclosure.

Therefore, the above-described embodiments should be understood as being illustrative in all aspects and not restrictive, the scope of the present disclosure being described in detail in the following claims, and all changes or modifications derived from the meaning, scope and equivalent concept of the claims should be construed as falling within the scope of the present disclosure.

| [DESCRIPTION OF REFERENCE NUMERALS] | |
|---|---|
| 101: construction machine | 300: work device |
| 400: operating device | 450: swing sensor |
| 470: safety shut-off valve | 500: control device |
| 600: support plate | 670: guide pin |
| 680: bolt | 700, 702: rear member |
| 750: engine room | 780: through-hole |
| 800: multifunctional auxiliary brake light | 810: lamp portion |
| 820: coupling portion | 821: bolt fastening hole |
| 825: reinforcing rib | 850: cable |
| 870: insulating stopper | 900: protective plate |

INDUSTRIAL APPLICABILITY

Embodiments of the present disclosure may be used to provide a construction machine capable of giving a warning to surroundings by classifying various work states through a multifunctional auxiliary brake light.

What is claimed is:

1. A construction machine comprising:
   a rear member provided at a rear of an engine room and having a through-hole communicating with the engine room;
   a support plate attached to the other surface of the rear member opposite to one surface facing the engine room;
   a multifunctional auxiliary brake light coupled to the support plate and extending in a left-right direction to express a selected one of a plurality of lighting or flashing patterns;
   a cable connected to the multifunctional auxiliary brake light through the through-hole of the rear member; and
   a control device connected to the cable to control the multifunctional auxiliary brake light,
   wherein the rear member is a counterweight.

2. The construction machine of claim 1, wherein the support plate is formed in a structure that seals the engine room.

3. The construction machine of claim 1, wherein
   the counterweight includes a curved shape, and
   the multifunctional auxiliary brake light has a shape corresponding to the curved shape of the counterweight and is coupled to the counterweight.

4. The construction machine of claim 3, further comprising:
   a protective plate coupled to the support plate and surrounding an edge of the multifunctional auxiliary brake light to protect the multifunctional auxiliary brake light.

5. The construction machine of claim 4, wherein the protective plate is buried in the counterweight to be coupled to the counterweight.

6. The construction machine of claim 1, wherein
   the multifunctional auxiliary brake light includes:
   a lamp portion; and
   a coupling portion fastened to the support plate by a bolt to couple the lamp portion to the support plate.

7. The construction machine of claim 6, wherein the coupling portion includes a bolt fastening hole and a plurality of reinforcing ribs formed radially around the bolt fastening hole.

8. A construction machine comprising:

a traveling body; and a rotating body rotatably installed above the traveling body and including:

an engine room;

a rear member provided at a rear of the engine room and having a through-hole communicating with the engine room;

a support plate attached to a surface of the rear member opposite to a surface facing the engine room;

a multifunctional auxiliary brake light coupled to the support plate and extending in a left-right direction to express a selected one of a plurality of lighting or flashing patterns; and a cable connected to the multifunctional auxiliary brake light through the through-hole of the rear member;

a control device connected to the cable to control the multifunctional auxiliary brake light; and various work devices.

9. The construction machine of claim 8, further comprising:

an operating device configured to perform various operations of the traveling body and the rotating body;

a swing sensor configured to detect a turning operation of the rotating body; and a safety shut-off valve configured to cut off pilot pressure to control the operation of the work device, wherein the control device is configured to select one of the plurality of lighting or flashing patterns to be expressed by the multifunctional auxiliary brake light according to an information signal provided by one or more of the operating device, the swing sensor, and the safety shut-off valve and operation information of the work device.

10. The construction machine of claim 9, wherein, when a forward/reverse gear neutral signal is input, the safety shut-off valve operates, and a brake operation signal is input, the control device is configured to turn on the multifunctional auxiliary brake light as an auxiliary brake light.

11. The construction machine of claim 9, wherein, when a forward/reverse gear neutral signal is input, the safety shut-off valve does not operate, and a work signal of the work device is not input, the control device is configured to recognize as a work ready state and to turn on the multifunctional auxiliary brake light to warn that work starts.

12. The construction machine of claim 9, wherein, when a forward/reverse gear neutral signal is input, the safety shut-off valve does not operate, and a work signal from the work device is input, the control device is configured to recognize as a working state and to cause the multifunctional auxiliary brake light to be flashed to warn that work is in progress.

13. The construction machine of claim 9, wherein, when a forward/reverse gear neutral signal is not input and a work signal from the work device is not input, the control device is configured to turn on the multifunctional auxiliary brake light as an auxiliary brake light.

14. The construction machine of claim 9, wherein, when a forward/reverse gear neutral signal is not input, a work signal from the work device is input, and a turning signal is not input, the control device is configured to recognize as a working state and to flash the multifunctional auxiliary brake light to warn that work is in progress.

15. The construction machine of claim 9, wherein, when the forward/reverse gear neutral signal is not input, a work signal from the work device is input, and a turning signal is input, the control device is configured to repeatedly and sequentially turn on the multifunctional auxiliary brake light in a turning direction to indicate the turning direction.

16. The construction machine of claim 8, wherein the rear member is an engine room cover.

17. The construction machine of claim 16, wherein the support plate is formed to surround the multifunctional auxiliary brake light entirely.

* * * * *